July 4, 1967  A. BAX  3,328,879
MEANS FOR RESILIENTLY MOUNTING FOR ARTIFICIAL TEETH
Filed July 16, 1964
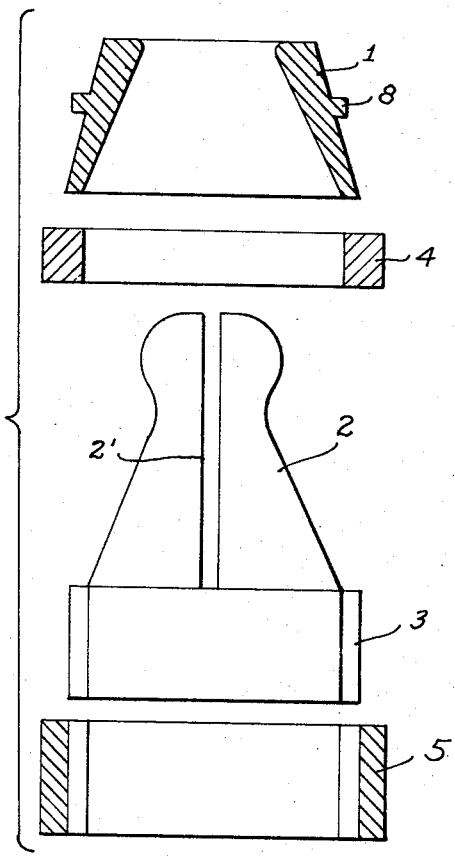
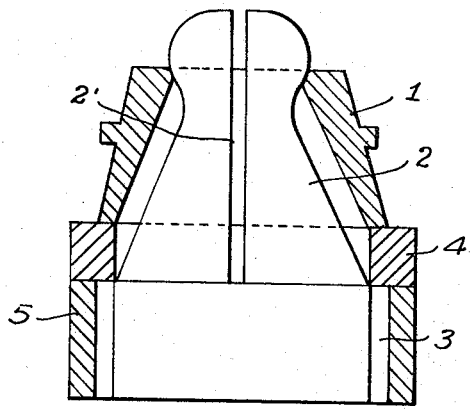
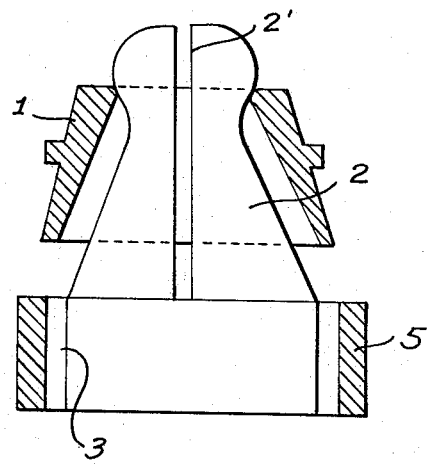
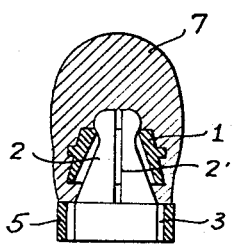
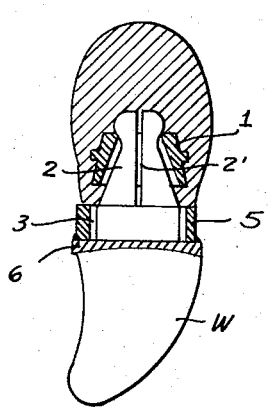
INVENTOR.
ARTHUR BAX
BY
Linton and Linton
ATTORNEYS.

United States Patent Office 3,328,879
Patented July 4, 1967

3,328,879
MEANS FOR RESILIENTLY MOUNTING
ARTIFICIAL TEETH
Arthur Bax, 50 ter Rivierenlaan, Deurne-
Antwerp, Belgium
Filed July 16, 1964, Ser. No. 383,122
1 Claim. (Cl. 32—12)

The present invention consists in a device for resiliently mounting an artificial tooth upon the stump of a natural tooth which has been provided for the purpose with a crown or cap.

The invention has for its object to afford to the artificial tooth a mobility in all directions during the mastication of aliments.

The resilient anchoring device according to the invention is formed by a conical stud having a cylindrical base provided with screw threads and a spherical end part at its apex, the resiliency of the stud being secured by crossing slits, a conical sleeve surrounding the stud, the bore of said sleeve being conically larger than the cone of the stud, the smaller opening of the sleeve contacting the stud upright close to the spherical end part, a nut screwed upon said cylindrical base and welded upon the cap covering a tooth stump and a metal annulus forming a temporary spacing member between the nut on the base and the conical sleeve, said annulus to be removed after the artificial tooth has been located upon the conical sleeve. It results from this assemblage that the artificial tooth is movable in all directions upon the conical stud and may be unscrewed from the threaded nut which has been welded upon the cap of the tooth stump.

The invention will be described hereafter in a preferred form of embodiment with reference to the accompanying drawing.

FIGURE 1 is an exploded vertical sectional view of the four elements of the resilient mounting device.

FIGURE 2 is a vertical sectional view of the resilient mounting device with its four elements assembled.

FIGURE 3 shows the mounting device of FIGURE 2 after removal of the spacing annulus from between the nut and the resilient stud.

FIGURE 4 is a cross-sectional view reduced in size, showing the position of the elements of the mounting device with the attached artificial tooth, and FIGURE 5 is a cross-sectional view, reduced in size, showing the position of the mounting device with the artificial tooth upon the stump of a natural tooth.

The unscrewable mounting device according to the invention is formed with a conical sleeve 1 having a conical bore and an outwardly projecting rib 8 provided for steadily holding the artificial tooth upon the sleeve, a conical resilient stud 2 having crossed slits 2' and a cylindrical base 3 provided with screw threads (not shown) upon which a nut 5 is screwed. The nut 5 is to be welded upon a cap 6 covering the stump of the natural tooth W. A metallic annulus 4 forms temporarily a spacing piece between the nut 5 and the sleeve 1. The conical bore of the sleeve 1 is larger than the cone of the stud 2.

The treatment of this dental prosthesis is used by assembling the elements 1, 2, 3, 4 and 5 as is shown in FIGURE 2 and in this position the artificial tooth 7 is fixed upon the sleeve 1 and steadily retained thereon by means of the ribs 8 keyed thereto. The nut 5 is now unscrewed and the annulus 4 is removed, this position being illustrated in FIGURE 3. The nut 5 is welded upon the cap covering the stump W of the natural tooth and the resilient stud 2 with the artificial tooth is screwed down in the nut 5. The said assembly appears clearly from FIGURES 4 and 5.

The anchoring device according to the invention presents the advantage that the resilient stud with the artificial tooth may be unscrewed from the nut 5 and that the conical sleeve bearing the artificial tooth has a limited mobility upon the nipple of the resilient stud with a slight clearance between the nut 5 and the artificial tooth, so that this artificial tooth moves in all directions during the mastication of aliments and by the fact that the artificial tooth with its resilient stud may be unscrewed so that the maintenance of this prosthesis is assured at all times.

I claim:

Means for securing an artificial tooth crown to the capped stump of a natural tooth comprising, a nut to be fixedly attached to the cap on the natural tooth stump, a resilient stud having a threaded cylindrical base in threaded engagement with said nut and a conical portion above said stud base, said stud conical portion having slits extending cross-wise thereof and a spherical end portion at the apex of said stud, a conical sleeve having a conical bore with said stud conical portion extending within said sleeve bore between said stud spherical end portion and said stud base, said sleeve bore being of a greater diameter than the conical portion of said stud, said conical sleeve having an outwardly projecting rib adapted to be keyed to said artificial tooth crown for retaining the artificial tooth crown thereon, an annulus providing a temporary spacing piece detachably seated on said nut and having said conical sleeve detachably seated thereon whereby after the removal of said annulus from nut and conical sleeve said conical sleeve and artificial tooth crown thereon may be slightly moved in all directions with relation to said nut.

References Cited
UNITED STATES PATENTS
2,866,285  12/1958  Gerber _____ 32—9
FOREIGN PATENTS
481,885  6/1953  Italy.
610,723  10/1960  Italy.

RICHARD A. GAUDET, Primary Examiner.
R. E. MORGAN, Assistant Examiner.